United States Patent
Tone

(10) Patent No.: US 6,431,988 B1
(45) Date of Patent: Aug. 13, 2002

(54) FIXED TYPE CONSTANT VELOCITY JOINT AND ASSEMBLING METHOD THEREFOR

(75) Inventor: Hiroshi Tone, Iwata (JP)

(73) Assignee: NTN Corporation, Osaka (JP)

( * ) Notice: Subject to any disclaimer, the term of this patent is extended or adjusted under 35 U.S.C. 154(b) by 28 days.

(21) Appl. No.: 09/659,828

(22) Filed: Sep. 11, 2000

(30) Foreign Application Priority Data

| Sep. 17, 1999 | (JP) | 11-264068 |
| Apr. 20, 2000 | (JP) | 2000-119875 |
| Apr. 27, 2000 | (JP) | 2000-127566 |
| Jun. 2, 2000 | (JP) | 2000-165952 |

(51) Int. Cl.$^7$ .............................................. F16D 3/22
(52) U.S. Cl. ...................................... 464/145; 964/906
(58) Field of Search .................... 464/145, 146, 464/139, 141, 143, 906

(56) References Cited

U.S. PATENT DOCUMENTS

| 2,046,584 A | * | 7/1936 | Rzeppa ....................... 464/145 |
| 3,879,960 A | * | 4/1975 | Welschof et al. ............. 464/145 |
| 3,899,898 A | * | 8/1975 | Takahashi et al. ........... 464/145 |
| 4,188,803 A | * | 2/1980 | Otsuka et al. ............... 464/145 |
| 4,191,031 A | * | 3/1980 | Girguis et al. ............... 464/145 |
| 4,325,232 A | * | 4/1982 | Girguis ........................ 464/145 |
| 4,494,941 A | * | 1/1985 | Hirai et al. .................. 464/145 |
| 4,533,339 A | * | 8/1985 | Girguis ........................ 464/146 |
| 4,673,375 A | * | 6/1987 | Adolfsson .................... 464/145 |
| 4,698,047 A | * | 10/1987 | Welschof et al. ............ 464/145 |
| 4,820,240 A | * | 4/1989 | Girguis ........................ 464/145 |
| 4,878,882 A | * | 11/1989 | Welschof et al. ............ 464/144 |
| 4,968,287 A | * | 11/1990 | Jacob ........................... 464/145 |
| 5,549,514 A | * | 8/1996 | Welschof ..................... 464/145 |
| 5,685,777 A | * | 11/1997 | Schwarzler ................. 464/145 |
| 5,692,960 A | * | 12/1997 | Sugiyama et al. ........... 464/145 |
| 5,782,696 A | * | 7/1998 | Guimbretiere ............... 464/145 |
| 6,135,891 A | * | 10/2000 | Sone et al. ................... 464/145 |
| 6,186,899 B1 | * | 2/2001 | Thomas et al. .............. 464/145 |
| 6,319,133 B1 | * | 11/2001 | Schwarzler et al. ......... 464/145 |

* cited by examiner

Primary Examiner—Lynne H. Browne
Assistant Examiner—Kenn Thompson
(74) Attorney, Agent, or Firm—Arent Fox Kintner Plotkin & Kahn, PLLC

(57) ABSTRACT

A fixed type constant velocity joint comprising an outer ring whose inner spherical surface is formed with a plurality of track grooves disposed at circumferentially equispaced intervals to extend axially toward an open end. An inner ring whose outer spherical surface is formed with a plurality of track grooves is paired with the track grooves of the outer ring disposed at circumferentially equispaced intervals to extend axially. A plurality of balls is interposed between the track grooves of the outer and inner rings to transmit torque. A cage is interposed between the inner spherical surface of the outer ring and outer spherical surface of the inner ring to hold the balls. The open-side groove bottom of each track groove of the outer ring is shaped as a taper linearly diameter-expanded toward the open end thereof.

13 Claims, 17 Drawing Sheets

Inventive article

Conventional article

FIXED TYPE CONSTANT VELOCITY JOINT AND ASSEMBLING METHOD THEREFOR

BACKGROUND OF THE INVENTION

The present invention relates to a fixed type constant velocity joint used in power transmission systems for automobiles and various industrial machines and adapted to tolerate only an operating angular displacement between two shafts on the driving and driven sides, and it also relates to an assembling method therefor.

For example, there is a fixed type constant velocity joint in the form of a UF (undercut free) type shown in FIG. 15. This constant velocity joint comprises an outer ring 5 that has a mouth portion 4 and whose inner spherical surface 1 is formed with a plurality of track grooves 2 disposed at circumferentially equispaced intervals to extend axially toward an open end 3, an inner ring 8 whose outer spherical surface 6 is formed with a plurality of track grooves 7 paired with the track grooves 2 of the outer ring 5 and disposed at circumferentially equispaced intervals to extend axially, a plurality of balls 9 interposed between the track grooves 2 and 7 of the outer and inner rings 5 and 8 for torque transmission, and a cage 10 interposed between the inner spherical surface 1 of the outer ring 5 and the outer spherical surface 6 of the inner ring 8 for holding the balls 9. The plurality of balls 9 are received in pockets 13 formed in the cage 10 and disposed at circumferentially equispaced intervals.

A stem portion (not shown) integrally extending from the mouth portion 4 of the outer ring 5 has, for example, a rotatable shaft on the driven side connected thereto, while the inner ring 8 has a rotatable shaft on the driving side joined thereto as by serrations. This results in a construction that allows torque transmission while tolerating operating angular displacement between the two rotatable shafts.

FIG. 15 shows the state in which the operating angle $\theta$ is 0° and FIG. 16 shows the state in which the operating angle $\theta$ is at its maximum (50°). The operating angle $\theta$ shall mean an angle formed between the rotatable shaft X of the outer ring 5 and the rotatable shaft Y of the inner ring 8. Further, when the rotatable shafts X and Y of the outer and inner rings 5 and 8 take an operating angle $\theta$ other than 0°, the plane perpendicular to the bisector of the angle $\theta$ between the two rotatable shafts X and Y is referred to as the joint center plane P'. If all of the balls 9 are in the joint center plane P when an operating angle $\theta$ is taken, the distances from the ball center to the two rotatable axes X and Y are equal; therefore, transmission of rotary motion at constant velocity is performed between the two rotatable shafts X and Y. The intersection between the joint center plane P' and the rotatable shaft X, Y is referred to as the joint center O'. In this constant velocity joint, the joint center O' is fixed without regard to the operating angle $\theta$.

Each track groove 2 in the outer ring 5 is formed to predetermined depths from the inner spherical surface 1 of the outer ring 5, its depth gradually varying axially. This track groove 2 has an arcuate bottom $2a$ in the innermost region of the mouth portion 4, and a straight bottom $2b$ parallel to the rotatable shaft X on the open side of the mouth portion 4. Each track groove 7 of the inner ring 8 is formed to predetermined depths from the outer spherical surface 6 of the inner ring 8, its depth gradually varying axially. This track groove 7 has an arcuate bottom $7a$ on the open side of the mouth portion 4, and a straight bottom $7b$ parallel to the rotatable shaft Y in the innermost region of the mouth portion 4.

In recent years, there have been needs for reduction of the minimum radius of rotation of automobiles (particularly, light-weight cars and small-sized cars) and the increase of the operating angle as the degree of freedom of geometrical design is increased for better automobile steerability. However, with conventional constant velocity joints, an operating angle $\theta$ max=50° is the upper limit. And realizing the increase of the operating angle requires increasing the outer diameter of the mouth portion 4 of the outer ring 5. Therefore, at present a design that is counter to light weight and compact design cannot but be resorted to.

In this constant velocity joint, in order to provide a construction capable of taking large operating angles, the center of curvature, $O_1'$, of the track groove 2 of the outer ring 5 is axially offset by an distance F' with respect to the center of curvature, $O_4'$, of the inner spherical surface 1 of the outer ring 5, that is the outer spherical surface 12 of the cage 10, and the center of curvature, $O_2'$, of the track groove 7 of the inner ring 8 is axially offset by an distance F' in axially opposite directions of the outer ring-side with respect to the center of curvature, $O_3'$, of the outer spherical surface 6 of the inner ring 8, that is the inner spherical surface 11 of the cage 10 (track offset). Similarly, the center of curvature, $O_3'$, of the inner spherical surface 11 of the cage 10 and the center of curvature, $O_4'$, of the outer spherical surface 12 are axially offset with respect to the joint center plane P' in opposite directions by an equal distance f' (cage offset).

As a result, a pair of track grooves 2 and 7 form a wedge-shaped track whose spacing gradually varies axially in one direction. Each ball 9 is rollably incorporated between a pair of track grooves 2 and 7 and is subjected to the action of an axial tension that causes the ball to move toward wider spacings in the wedge-shaped track when torque is transmitted with the outer and inner rings 5 and 8 taking an operating angle $\theta$.

Further, in this constant velocity joint, the ratio of the cage offset quantity f' to the total offset quantity (f'+F') (the sum of the cage offset quantity f' and the track offset quantity F') is set such that f'/(f'+F')=0–0.11. Since optimum ranges of the cage offset quantity f' and the total offset quantity (f'+F') vary according to the size of the joint, they have to be determined in relation to the fundamental size indicating the joint size.

Therefore, the ratio, f'/PCR', of the cage offset quantity f' to the length PCR' of a line connecting the center of curvature, $O_2'$, of the track groove 7 of the inner ring 8 (or the center of curvature, $O_1'$, of the track groove 2 of the outer ring 5) and the center of the ball 9, is used, and, in conventional cases, the optimum range of the cage offset quantity f' is so set as to satisfy the relation f'/PCR'=0–0.017. Further, the ratio of the cage offset quantity f' to the total offset quantity (f'+F') is so set as to satisfy the following conditions:

when $(f'+F')/PCR'=0.14$, $f'/(f'+F')=0$, and when $(f'+F')/PCR'=0.15$, $f'/(f'+F')=0.11$.

In this connection, the conventional constant velocity joint has been designed to have a size and shape that satisfy the conditions that include f'/(f'+F')=0–0.11 and f'/PCR'=0–0.017. Therefore, the joint-making assembling of the inner ring 8, cage 10 and outer ring 5 has been performed in the following manner.

In incorporating the inner ring 8 into the cage 10, the inner ring 8 is positioned relative to the cage 10 at right angles to the axis of the cage 10, as shown in FIG. 17, and the spherical projection 14 positioned between the track grooves 7 of the inner ring 8 is dropped into one of the pockets 13 of the cage 10; in this state, the inner ring 8 is inserted into the cage 10. When the center $O_5'$ of the inner ring 8 coincides with the center $O_6'$ of the cage 10, the inner ring 8 is turned in a right angle direction with respect to the axis of the cage 10 and disposed in the normal position.

Further, in incorporating the cage 10 into the outer ring 5, the cage 10 is positioned at right angles with the outer ring 5, as shown in FIG. 18, and the spherical projection 15 positioned between the track grooves 2 of the outer ring 5 is aligned with a pocket 13 of the cage 10 and inserted therein. When the center $O_6'$ of the cage 10 coincides with the spherical center $O_7'$ of the outer ring 5, the cage 10 is turned in a right angle direction with respect to the outer ring 5 and disposed in the normal position.

In the cage 10, in order to avoid interference with the spherical projections 14 during the incorporation of the inner ring 8, interference with spherical projections 15 during the incorporation into the outer ring 5, and interference that, when an operating angle is taken during the incorporation of balls 9, is caused by the peripheral movement of other balls 9, it is necessary that the peripheral dimension of the pockets 13 be set at the proper value.

Increasing the peripheral dimension of the pockets 13 suppresses the interference that occurs during the incorporation but lowers the strength of the cage 10 since the pillar width between adjacent pockets 13 is reduced. Reversely, reducing the peripheral dimension of the pockets 13 increases the pillar width between adjacent pockets 13 and hence improves the strength of the cage 10 but makes it difficult to suppress the interference that occurs during incorporation.

Therefore, the peripheral dimension of the pockets 13 has to be set with consideration given to the cage strength to avoid interference between the spherical projections 14 and 15 of the inner and outer rings 8 and 5 and interference due to peripheral movement of the balls 9; thus, there have been many limitations on the design of the joint.

Depending on the joint size and offset quantity, the pillar width dimension between adjacent pockets 13 is reduced to lower the cage strength in some cases; therefore, countermeasures have been taken by providing a pair of incorporation-exclusive elongated openings at diametrically opposite positions in the cage 10 or forming a notch 16 (see FIGS. 15 and 17) in the inlet-side end edge of the spherical projection 14 of the inner ring 8 so as to facilitate the dropping of the cage 10 into the pocket 13. However, in this case, the cage 10 and inner ring 8 have to be machined, leading to an increase in cost.

During the incorporation of the inner ring 8 into the cage 10, the inner ring 8 has to be once dropped into the pocket 13 of the cage 10 and during the incorporation of the cage 10 into the outer ring 5 two-stage operation, i.e., inserting the cage 10 into the outer ring 5 and then turning it in the right angle direction, has to be performed. This has complicated automatic assembly, etc. in respective incorporating operations.

Further, since the conventional constant velocity joint is designed with a size and shape such that the ratio of the cage offset quantity f' to the total offset quantity (f'+F') satisfies the above-mentioned conditions, the incorporation of the balls 9 has been performed in the following manner.

First, with the inner ring 8 and cage 10 incorporated into the outer ring 5, the track groove 2 of the outer ring 5, the pocket 13 of the cage 10, and the track groove 7 of the inner ring 8 are radially positioned relative to each other, as shown in FIG. 19, whereupon the cage 10 and inner ring 8 are axially tilted with respect to the outer ring 5 such that the clearance between the open end 3 of the outer ring 5 and the inlet-side end of the pocket 13 of the cage 10 is larger than the ball diameter.

One of the pockets 13 of the cage 10 thus faces the outside through the open end 3 of the outer ring 5 and the ball 9 is inserted through the clearance between the open end 3 of the outer ring 5 and the inlet-side end of the pocket 13 of the cage 10; in this manner, the balls 9 are successively inserted into the remaining pockets 13.

And, in incorporating the last ball 9, the latter is inserted into the pocket 13 in a phase with an incorporation angle $\phi=0°$, as shown in FIG. 20, that is, in a direction that coincides with the direction connecting the center of the pocket 13 and the center of the cage 10.

In inserting the last ball 9, the balls 9 that are on the track side having an axial curvature in the innermost region of the outer ring 5, that is, the balls 9 in $\phi=120°$ and $240°$ phases, move peripherally and interfere with the ends of the pockets 13, which movement is caused by axially tilting the cage 10 with respect to the outer ring 5. If the peripheral dimension of the pockets 13 is increased, interference during incorporation can be suppressed, but the width dimension of the pillar 14 between adjacent pockets 13 becomes smaller and hence the strength of the cage 10 lowers. Reversely, if the peripheral dimension of the pockets 13 is reduced, the width dimension of the pillars 14 of the cage 10 can be increased, so that the strength of the cage 10 can be improved; however, it becomes difficult to suppress interference during incorporation.

Therefore, the peripheral dimension of the pockets 13 has to be set with consideration given to the cage strength to avoid interference due to the peripheral movement of other balls 9 when an operating angle is taken during the incorporation of the ball 9. Thus there have been needs for the absence of interference due to the peripheral movement of balls 9 and for easily increasing the strength of the cage 10.

SUMMARY OF THE INVENTION

An object of the present invention is to easily realize the increase of the maximum operating angle, to suppress interference during the incorporation of parts, to simplify the incorporating operation, and to easily realize the increase of the strength of the cage.

According to the invention, in a fixed type constant velocity joint comprising an outer ring whose inner spherical surface is formed with a plurality of track grooves disposed at circumferentially equispaced intervals to extend axially toward the open end, an inner ring whose outer spherical surface is formed with a plurality of track grooves paired with said track grooves of the outer ring and disposed at circumferentially equispaced intervals to extend axially, a plurality of balls interposed between the track grooves of the outer and inner rings to transmit torque, and a cage interposed between the inner spherical surface of the outer ring and outer spherical surface of the inner ring to hold the balls, the open-side groove bottoms of the track grooves of the outer ring are tapered to be linearly diameter-expanded toward the open end thereof.

In addition, the innermost-side groove bottom of each track groove of the inner ring is shaped as a taper linearly diameter-expanded toward the innermost region. Further, it is desirable that the open-side groove bottoms of the track grooves of said outer ring or the innermost-side groove bottoms of the track grooves of the inner ring are tapered so that they are at right angles with a line connecting the center of curvature of the track groove of the outer ring (or the center of curvature of the track groove of the inner ring) and the ball center.

As a result, in the invention, the operating angle formed between the rotatable shafts of the outer and inner rings can be increased to a maximum of 52°, easily realizing the increase of the operating angle without increasing the outer diameter of the outer ring, the compact size of the outer ring, and the increase of the load capacity, and the needs for increased functionality and workability can be quickly coped with.

In the constant velocity joint of the invention, it is desirable that the centers of the outer and inner peripheral surfaces of the cage be axially offset with respect to the joint center plane including the ball center in opposite directions by an equal distance and that the cage offset quantity be set at a large value so as to ensure that the pockets of the cage restrain the balls from jumping out of the open end of the outer ring.

Setting the cage offset quantity at a large value has the advantage of being capable of increasing the wall-thickness of the inlet side of the cage, into which the inner ring is to be incorporated, to increase the strength. Further, since the wall-thickness of the inlet side of the cage can be increased, it is possible for the pocket of the cage to restrain the ball form jumping out of the open end of the outer ring when an operating angle is taken.

However, if the cage offset quantity is too large, ① the amount of peripheral movement of the ball in the pocket of the cage is increased, producing the necessity of increasing the peripheral dimension of the pocket in order to secure the proper movement of the ball, leading to the thinning of the pillar of the cage, posing a problem in an aspect of strength. ② The wall-thickness of the innermost region located opposite to the inlet side of the cage is reduced, posing a problem in an aspect of strength.

It follows from the above that excessive cage offset quantity is not desirable and that there exists the optimum range capable of keeping balance between the significance of providing the cage offset quantity and the problems ① and ②. Since the optimum range of cage offset quantity varies with the size of the joint, it has to be determined in relation to the fundamental size indicating the size of the joint. Therefore, the ratio (f/PCR) of the cage offset quantity f to the length PCR of a line connecting the center of curvature of the track groove of the outer ring (or the center of curvature of the track groove of the inner ring) and the ball center is used.

The cage offset quantity f in the invention is set such that the ratio (f/PCR) of the cage offset quantity f to the length PCR of a line connecting the center of curvature of the track groove of the outer ring (or the center of curvature of the track groove of the inner ring) and the ball center is within the range of 0.017–0.150.

If this ratio (f/PCR) is larger than 0.150, the problems ① and ② arise, and, inversely, if it is smaller than 0.017, the significance of providing the cage offset quantity f is lost. That is, the purpose of the cage offset is to prevent the point of contact of the ball with the open side of the outer ring from sticking out of the pocket of the cage; with the range of smaller than 0.017, the purpose cannot be attained. Therefore, from the standpoint of securing cage strength and durability, the optimum range of cage offset quantity f is such that the ratio (f/PCR) is within the range of 0.017–0.150.

In the invention, besides the cage offset quantity f described above, the center of curvature of the track groove of the outer ring and the center of curvature of the track groove of the inner ring are axially offset with respect to the joint center plane including the ball center in opposite directions by an equal distance, and the track offset quantity F is so set between it and the cage offset quantity f as to satisfy the condition f/(f+F) =0.12–1.0.

This suppresses interference between members during the incorporation of the inner ring, cage, and outer ring to simplify the incorporating operation, and lessens the limitations on the design of the joint, making it possible to easily secure the strength of the cage.

That is, since the opening diameter of the innermost region of the cage becomes larger than in the conventional type, in incorporating the inner ring into the cage, the inner ring can be inserted into the cage without dropping the spherical projection of the inner ring into the pocket of the cage from the innermost region of the cage. Further, since the opening diameter of the outer ring becomes larger than in the conventional type, in incorporating the cage into the outer ring, the cage can be inserted into the outer ring with the cage facing the same axial direction and with the pocket aligned with the spherical projection of the outer ring.

As a result, the peripheral dimension of the pocket can be set by only giving consideration to the amount of peripheral movement of the ball when an operating angle is taken during the incorporation of the ball, without having to give consideration to interference with the spherical projection during the incorporation of the inner ring and interference with the spherical projection during incorporation into the outer ring; thus, the design of the joint is facilitated.

In the relation between the track offset quantity F and the cage offset quantity f, when (f+F) is larger than 1.0, that is, when the track offset quantity F becomes minus, the direction of offset is reversed, providing a construction in which contact position sticks out of the pocket in the phase where the innermost region of the cage is loaded; thus, this does not establish a mechanism. Reversely, if it is smaller than 0.12, the resulting range is the same as that employed by the conventional constant velocity joint and is insufficient to provide a mechanism for increased operating angles based on this constant velocity joint. Therefore, from the standpoint of mechanism establishment, most suitably f/(f+F) is within the range of 0.12–1.0.

In the invention, in the relation of the track offset quantity F, the cage offset quantity f, and length PCR of a line connecting the center of curvature of the track groove of the outer ring (or the center of curvature of the track groove of the inner ring) and the center of the ball, the following conditions are satisfied;

when $(f+F)/PCR=0.1$, $f/(f+F)=0.35$ or above, when $(f+F)/PCR=0.2$, $f/(f+F)=0.11$ or above, and when $(f+F)/PCR=0.3$, $f/(f+F)=0.03$ or above.

This setting of the conditions realizes the increase of the maximum operating angle.

In realizing the increase of the maximum operating angle, the method of assembling a constant velocity joint adapted to satisfy said conditions involves, when the last ball is to be incorporated into a pocket of the cage, inserting the ball in the direction that forms a predetermined phase angle with the radial direction of the cage passing through the center of the pocket. This allows the interference angle between the already incorporated ball in the innermost region of the outer ring and the pillar between adjacent cage pockets to be made larger than in the conventional case.

Therefore, during the insertion of the last ball, the amount of peripheral movement of the ball on the track side having a curvature axially of the innermost region of the outer ring becomes smaller than in the conventional case, so that the pillar width dimension between adjacent pockets can be set at a large value, facilitating the increase of the strength of the cage.

During the incorporation of balls, there is no possibility of a ball being positioned diametrically opposite to the ball insertion side concerning the radial direction of the cage, so that a substantial axial length of the track grooves becomes unnecessary, with the result that the axial length of the outer ring can be reduced to make the entire assembly compact in size.

If the open end of the inner spherical surface of the outer ring is chamfered or if, in each pocket of the cage, the outside open edges of the axially opposed side surfaces are chamfered, then the insertion into the outer ring can be further facilitated in such a manner that with the cage facing the same axial direction, the pocket is aligned with the spherical projection of the outer ring.

Further, the use of eight balls makes it possible to reduce the load on a single ball and to increase efficiency and provides superiority in strength, loading torque, and durability, allowing the ball diameter to be reduced, so that the entire joint can be reduced in size.

Further, it is desirable that a pocket clearance be formed so as not to retrain the ball in the innermost region of the pocket of the cage. This allows the strength of the cage to be secured even if the wall-thickness of the innermost region of the cage is reduced with the increase of the cage offset quantity.

DESCRIPTION OF PREFERRED EMBODIMENTS

Figure 1:
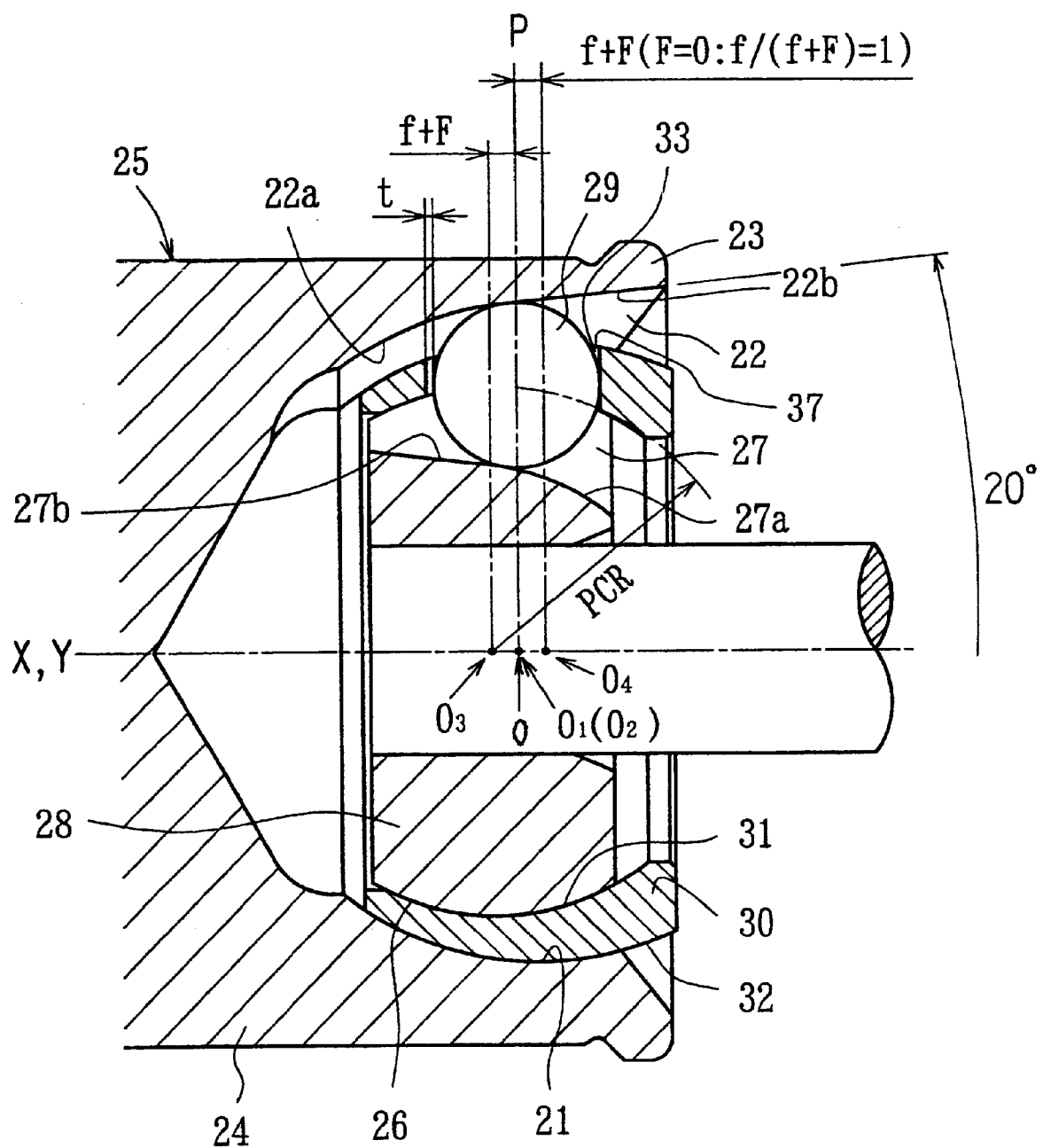
FIG. 1 is a sectional view showing a state where an operating angle is 0° in an embodiment of the invention.
Figure 2:
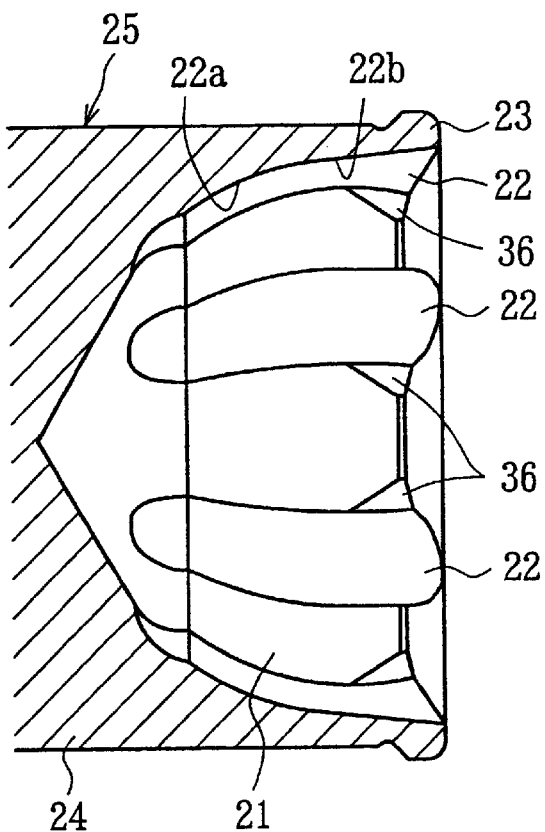
FIG. 2 is a sectional view showing an outer ring incorporated into the constant velocity joint of FIG. 1.
Figure 3:
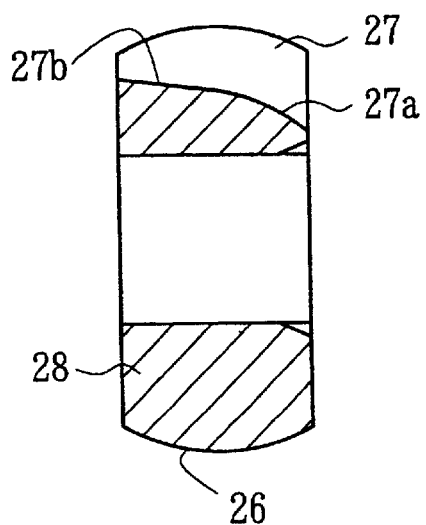
FIG. 3 is a sectional view showing an inner ring incorporated into the constant velocity joint of FIG. 1.

A fixed type constant velocity joint in an embodiment shown in FIG. 1 comprises an outer ring 25 (see FIG. 2) that has a mouth portion 24 and whose inner spherical surface 21 is formed with a plurality of track grooves 22 disposed at circumferentially equispaced intervals to extend axially toward an open end 23, an inner ring 28 (see FIG. 3) whose outer spherical surface 26 is formed with a plurality of track grooves 27 paired with the track grooves 22 of the outer ring 25 disposed at circumferentially equispaced intervals to extend axially, a plurality of balls 29 interposed between the track grooves 22 and 27 of the outer and inner rings 25 and 28 to transmit torque, and a cage 30 (see FIG. 4) interposed between the inner spherical surface 21 of the outer ring 25 and outer spherical surface 26 of the inner ring 28 to hold the balls 29. The plurality of balls 29 are received in pockets 33 formed in the cage 30 and disposed at circumferentially equispaced intervals.

Each track groove 22 in the outer ring 25 is tapered with its open-side groove bottom linearly diameter-expanded toward the open end 23. That is, the track groove 22 has an arcuate bottom 22a in the innermost region of the mouth portion 24, and a taper bottom 22b on the open side of the mouth portion 24 (see FIG. 2). On the other hand, each track groove 27 in the inner ring 28 is tapered with its innermost groove bottom linearly diameter-expanded toward the innermost region. That is, the track groove 27 has an arcuate bottom 27a on the open side of the mouth portion 24, and a tapered bottom 27b in the innermost region of the mouth portion 24 (see FIG. 3).

Shaping the open-side groove bottom of the track groove 22 of the mouth portion 24 of the outer ring 25 as the tapered bottom 22b linearly diameter-expanded toward the open end 23 realizes the increase of the operating angle without increasing the outer diameter of the mouth portion 24 of the outer ring 25. As a result, it is possible to make the outer ring 25 compact in size and to increase the load capacity.

For example the rotatable shaft on the driven side is connected to a stem portion (not shown) integrally extending from the mouth portion 24 of the outer ring 25, and the rotatable shaft on the driving side is joined to the inner ring 28 as by serrations. This results in a construction that allows torque transmission while tolerating an operating angle displacement between the two rotatable shafts.

Figure 5:
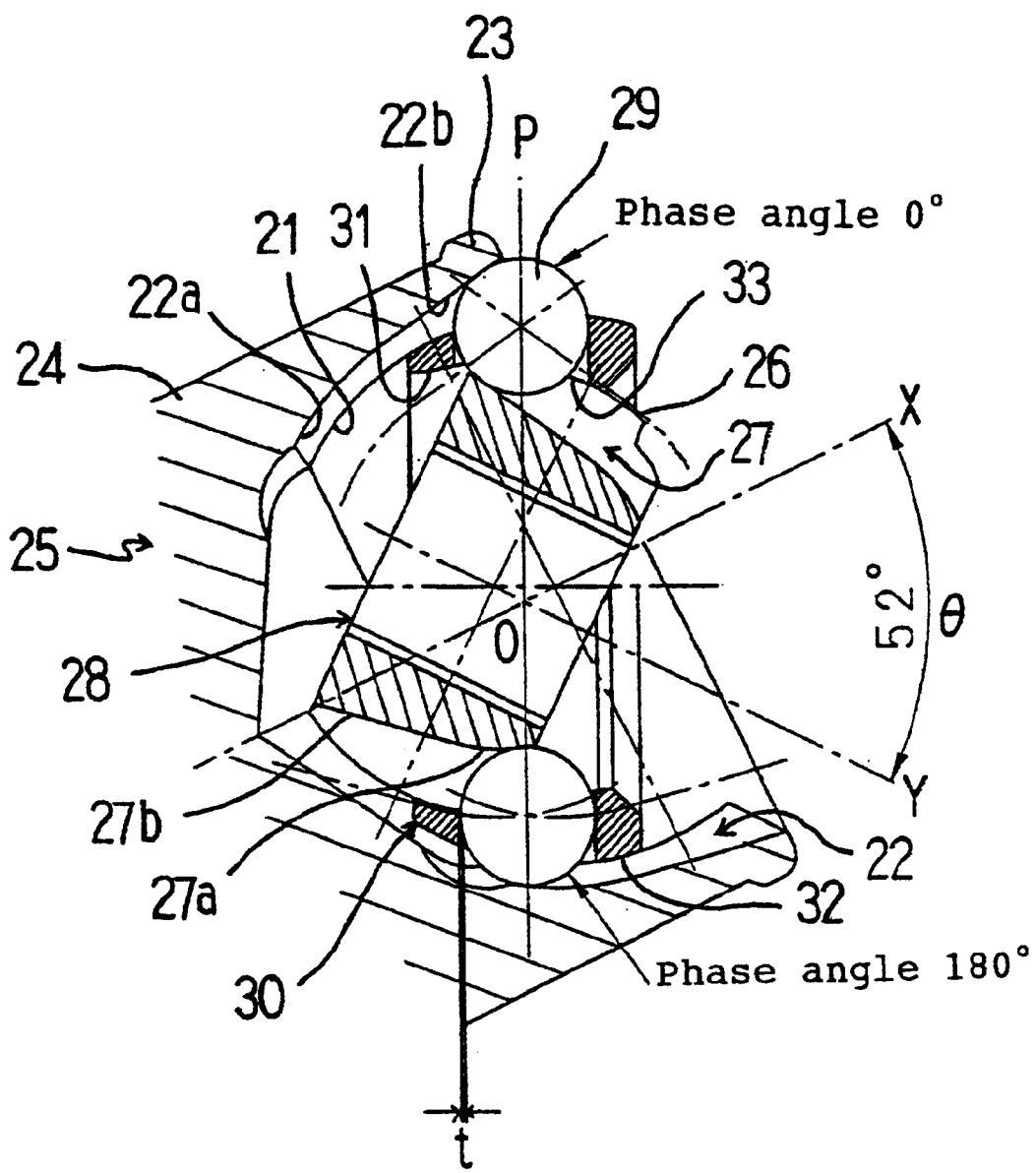
FIG. 5 is a sectional view showing a state where an operating angle is at its maximum, 52°, in an embodiment of the invention.

FIG. 1 shows the state of the operating angle θ being 0°, and FIG. 5 shows the state of the operating angle θ being at its maximum (52°). The operating angle θ shall mean an angle formed between the rotatable shaft X of the outer ring 25 and the rotatable shaft Y of the inner ring 28. Further, when the rotatable shafts X and Y of the outer and inner rings 25 and 28 take an operating angle θ other than 0°, the plane perpendicular to the bisector of the angle θ between the two rotatable shafts X and Y is referred to as the joint center plane P. If all of the balls 29 are in the joint center plane P when an operating angle θ is taken, the distances from the ball center to the two rotatable axes X and Y are equal; therefore, transmission of rotary motion at constant velocity is performed between the two rotatable shafts X and Y. The intersection between the joint center plane P and the rotatable shaft X, Y is referred to as the joint center O. In this constant velocity joint, the joint center O is fixed without regard to the operating angle θ.

Shaping the open-side groove bottom of the track groove 22 of the mouth portion 24 of the outer ring 25 as the tapered bottom 22b (for example, a diameter-expanded angle φ=20°) linearly diameter-expanded toward the open end 23 realizes the increase of the operating angle such that an operating angle θ max=52° (the conventional operating angle θ max+2°) without increasing the outer diameter of the mouth portion 24 of the outer ring 25, as shown in FIG. 5.

Figure 6:
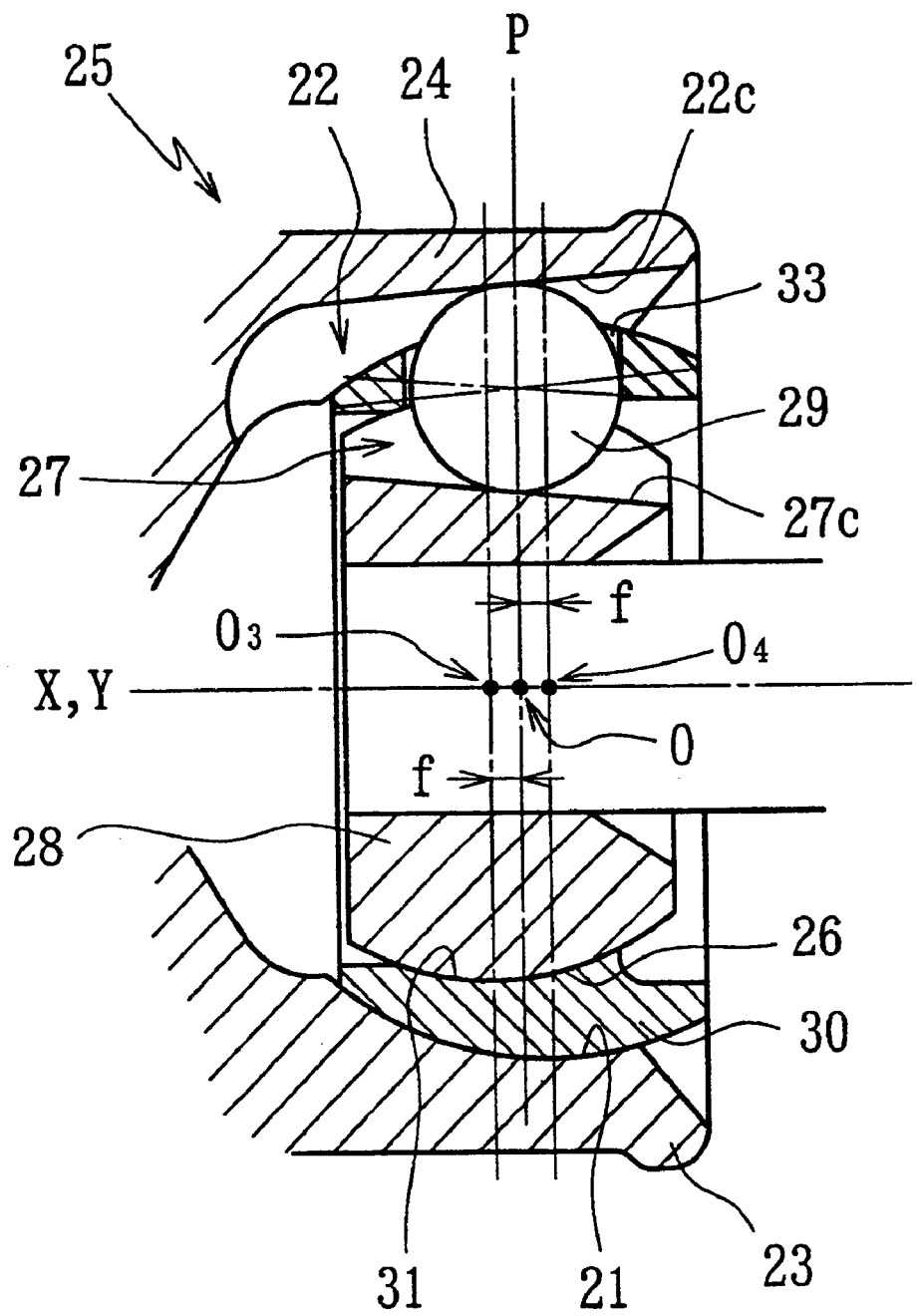
FIG. 6 is a sectional view showing a state where an operating angle is 0° in another embodiment of the invention.
Figure 7:
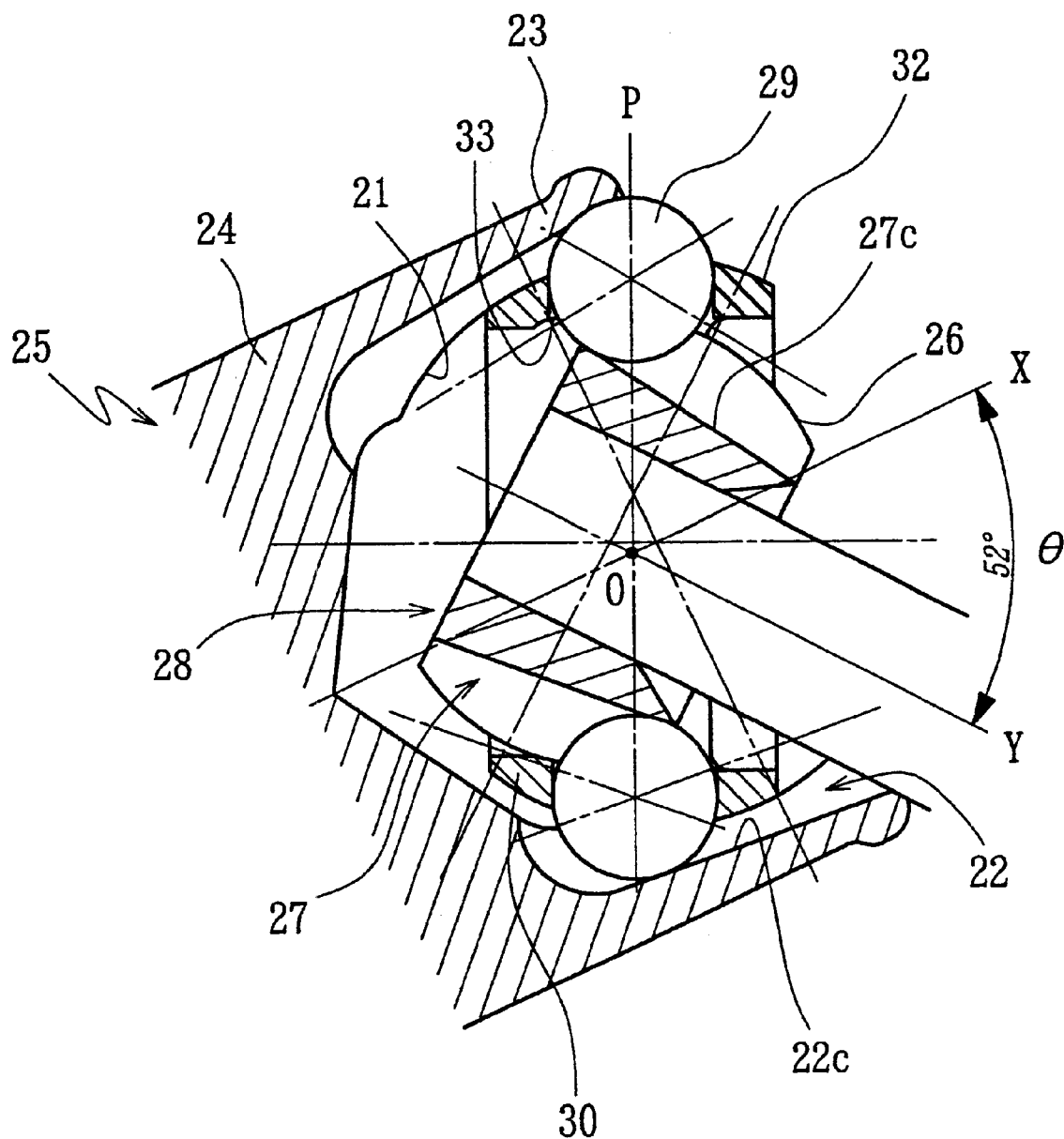
FIG. 7 is a sectional view showing a state where an operating angle is at its maximum, 52°, in another embodiment of the invention.

As shown in FIGS. 6 and 7, the entire axial shape of the track groove 22 of the outer ring 25 may be in the form of a straight taper. That is, the track groove 22 of the outer ring 25 may be formed with a straight taper bottom 22c uniformly diameter-expanded from the innermost region of the mouth portion 24 to its open end 23. Further, the track groove 27 of the inner ring 28 may be formed with a straight taper bottom 27c uniformly diameter-expanded from the open side of the mouth portion 24 toward its innermost region.

Shaping the entire groove bottom of the track groove 22 of the mouth portion 24 of the outer ring 25 as the straight taper bottom 22c diameter-expanded from the innermost region toward the open end 23 realizes the increase of the operating angle such that an operating angle θ max=52° (the conventional operating angle θ max+2°) without increasing the outer diameter of the mouth portion 24 of the outer ring 25. As a result, it is possible to make the outer ring 25 compact in size and to increase the load capacity. Further, it is also possible to improve workability, e.g., in cold forging.

In the constant velocity joint of FIG. 1, in order to provide a construction capable of taking large operating angles, the center of curvature, $O_1$, of the track groove 22 of the outer ring 25 and the center of curvature, $O_2$, of the track groove 27 of the inner ring 28 are axially offset with respect to the joint center plane P including the ball center in opposite directions by an equal distance F (track offset). The center of curvature, $O_3$, of the inner spherical surface 31 of the cage 30 and the center of curvature, $O_4$, of the outer spherical surface 32 are axially offset with respect to the joint center plane P in opposite directions by an equal distance f (cage offset).

As a result, a pair of track grooves 22 and 27 form a wedge-shaped track whose spacing gradually varies axially in one direction. Each ball 29 is rollably incorporated between a pair of track grooves 22 and 27 and is subjected to the action of an axial tension that causes the ball to move toward wider spacings in the wedge-shaped track when torque is transmitted with the outer and inner rings 25 and 28 taking an operating angle θ.

In order to prevent the balls 29 from jumping out of the open end 23 of the mouth portion 24 of the outer ring 25 when an operating angle θ max=52° is taken, the cage offset quantity f is set at a larger value than the conventional one so as to confine them in the pockets 33 of the cage 30.

In the constant velocity joint of this embodiment, the track offset quantity F is set in relation to the cage offset quantity f such that f/(f+F)=0.12–1.0. And the cage offset quantity f is set at a large value so as to ensure that the pockets 33 of the cage 30 restrain the balls 29 from jumping out of the open end 23 of the outer ring 25.

Since the optimum range of the cage offset quantity f varies according to the size of the joint, it has to be determined in relation to the fundamental size indicating the joint size. Therefore, the ratio, f/PCR, of the cage offset quantity f to the length PCR of a line connecting the center of curvature, $O_2$, of the track groove 27 of the inner ring 28 (or the center of curvature, $O_1$, of the track groove 22 of the outer ring 25) and the center of the ball 29, is used, and in this constant velocity joint, it is set in the range of f/PCR= 0.017–0.150.

Figure 15:
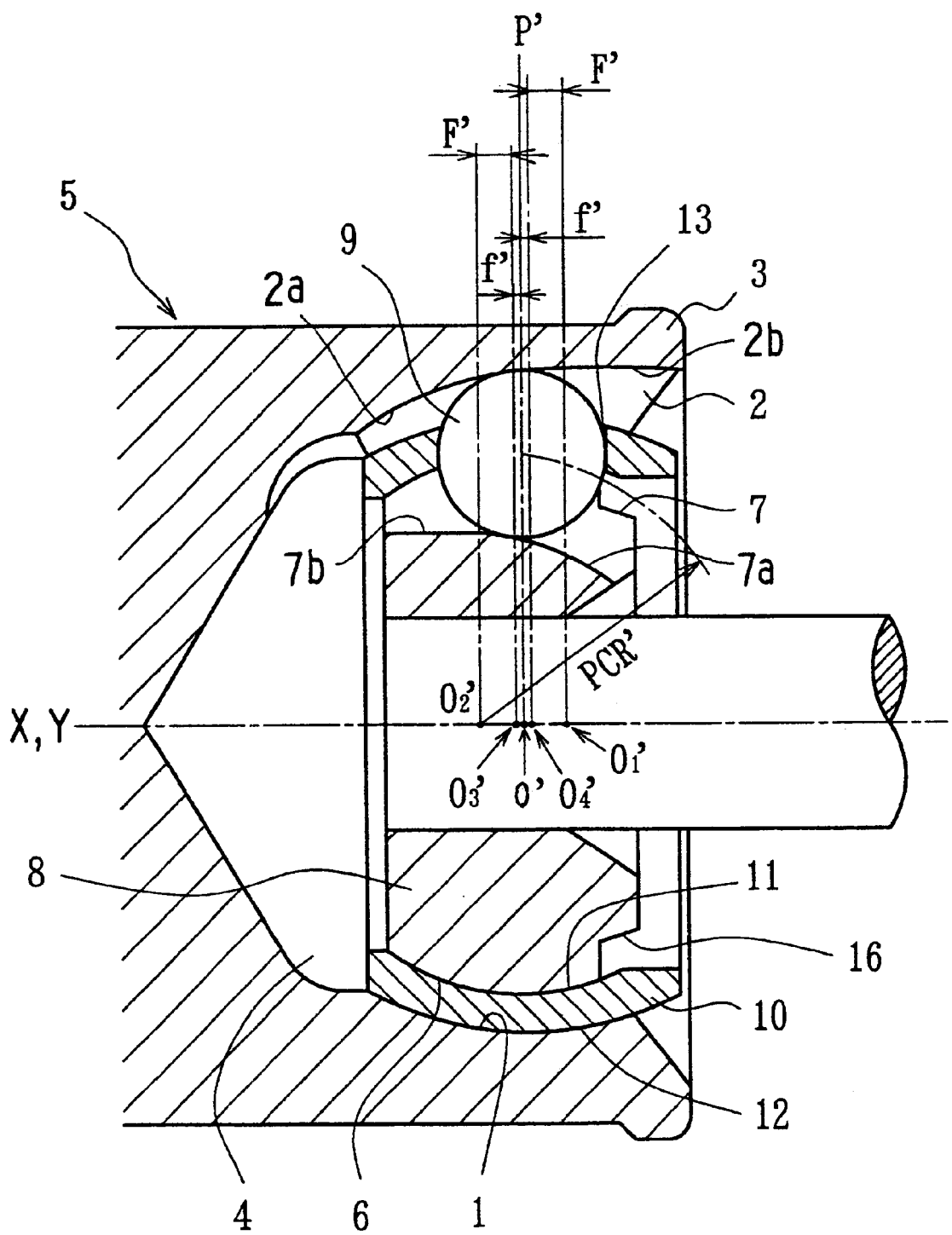
FIG. 15 is a sectional view showing a state where an operating angle is 0° in a conventional fixed type constant velocity joint.
Figure 16:
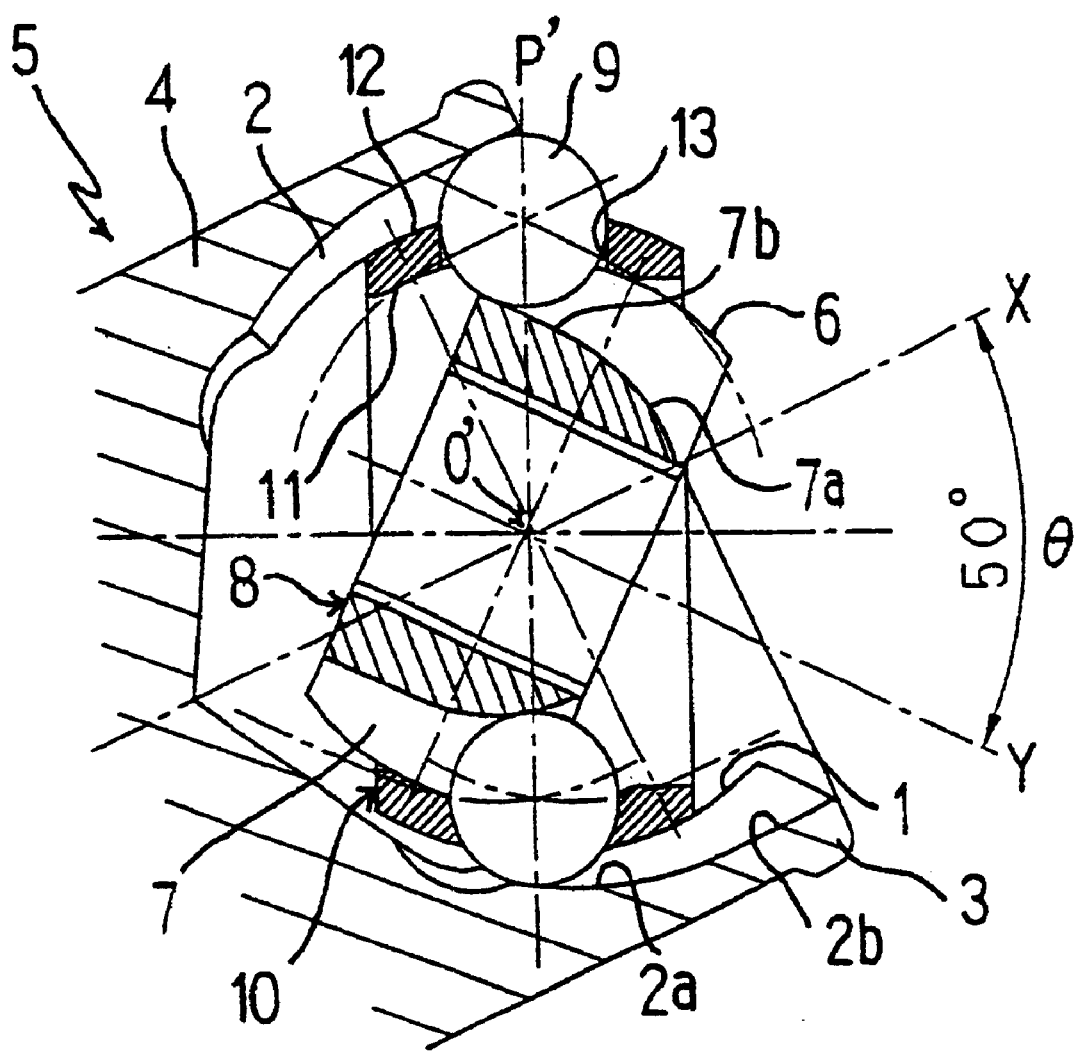
FIG. 16 is a sectional view showing the state where an operating angle is at its maximum, 50°, in the conventional fixed type constant velocity joint.
Figure 17:
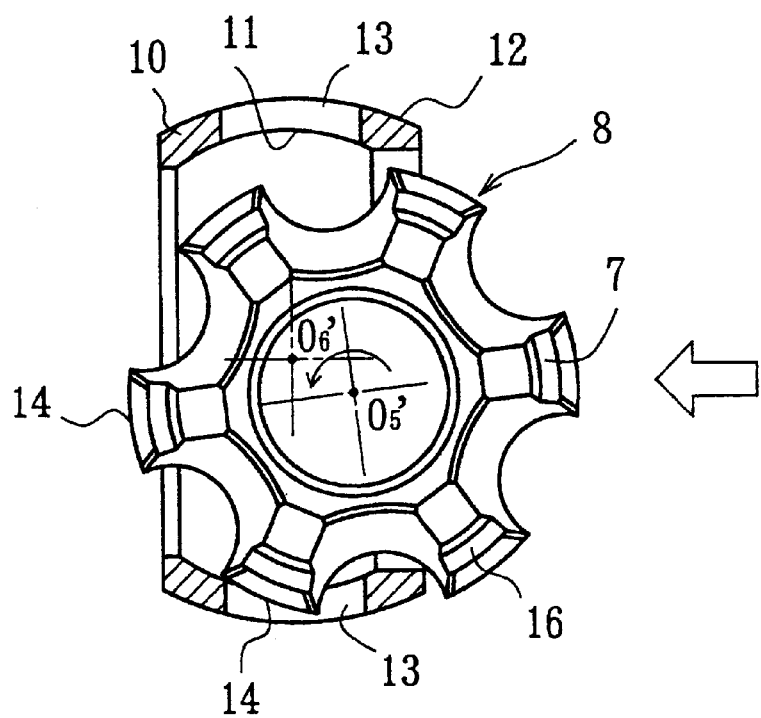
FIG. 17 is a sectional view showing the state of the inner ring being incorporated into the cage.
Figure 18:
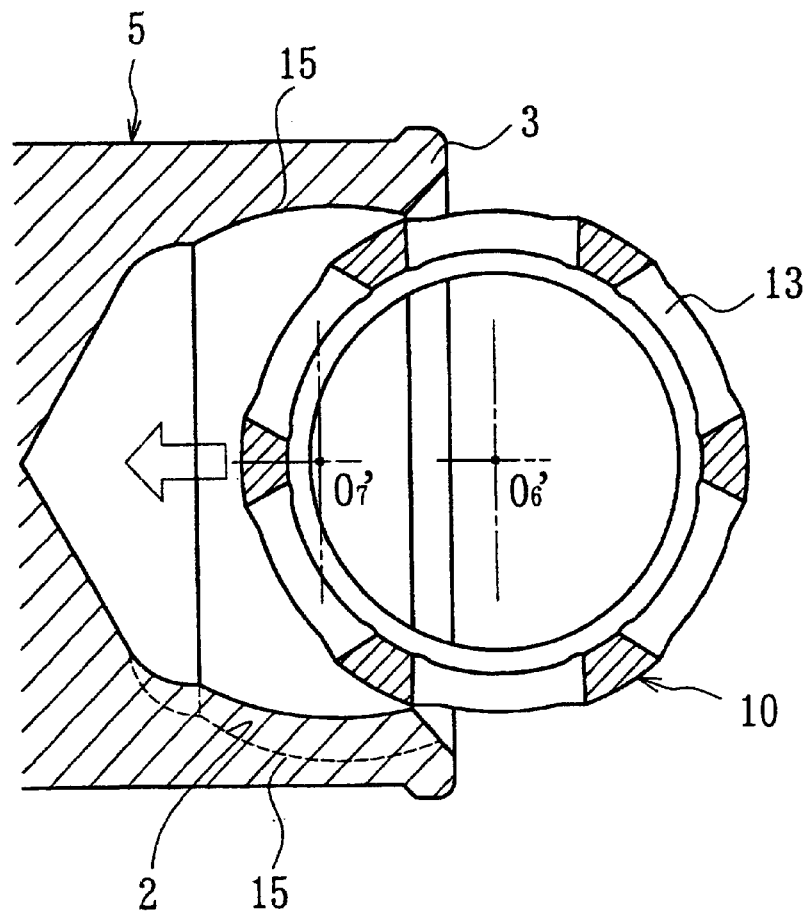
FIG. 18 is a sectional view showing the state of the cage being incorporated into the outer ring.
Figure 19:
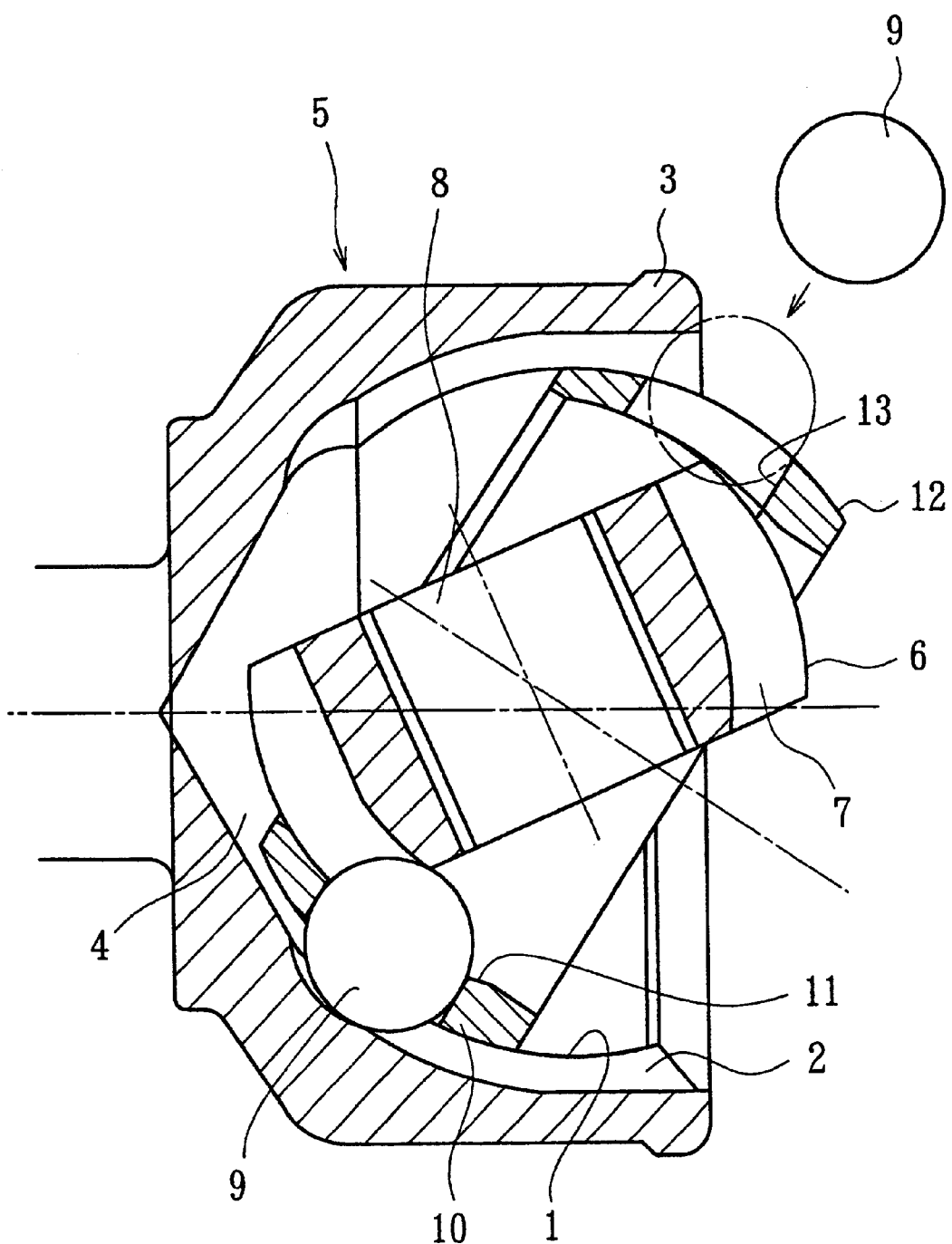
FIG. 19 is a sectional view showing the state of the last ball being incorporated.

For example, in a conventional article (see FIG. 15), the cage offset quantity f' is 0.42 mm, and the center locus radius PCR' of the ball 9 is 25 mm, so that the ratio (f'/PCR') of the cage offset quantity f' to the center locus radius PCR' of the ball 9 is 0.017. In contrast thereto, in the embodiment of the invention (see FIG. 1), if the maximum value of the cage offset quantity f is 3.2 mm and the center locus radius PCR of the ball 29 is 24 mm, then the ratio (f/PCR) of the cage offset quantity f to the center locus radius PCR of the ball 29 is 0.133.

Increasing the cage offset quantity f has been avoided from fears that the balls 29 in the innermost region of the cage 30 jump out of the pockets 33 of the cage 30, that the wall-thickness in the innermost region of the cage 30 becomes reduced, etc.

Figure 8:
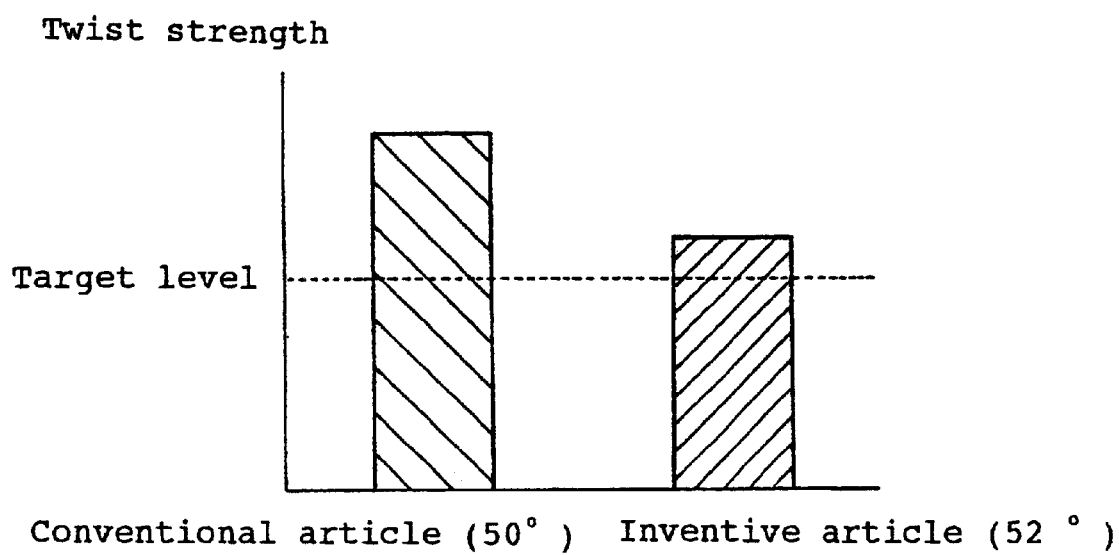
FIG. 8 is a graph showing the joint strength for a maximum operating angle in comparison with the joint strength for an operating angle of 0°.

FIG. 8 shows the joint strength (twist strength) for a maximum operating angle in comparison with the joint strength for an operating angle of 0°. The present inventive article, like the conventional one, reaches the target level, so that there is no problem in an aspect of strength.

Figure 9A:
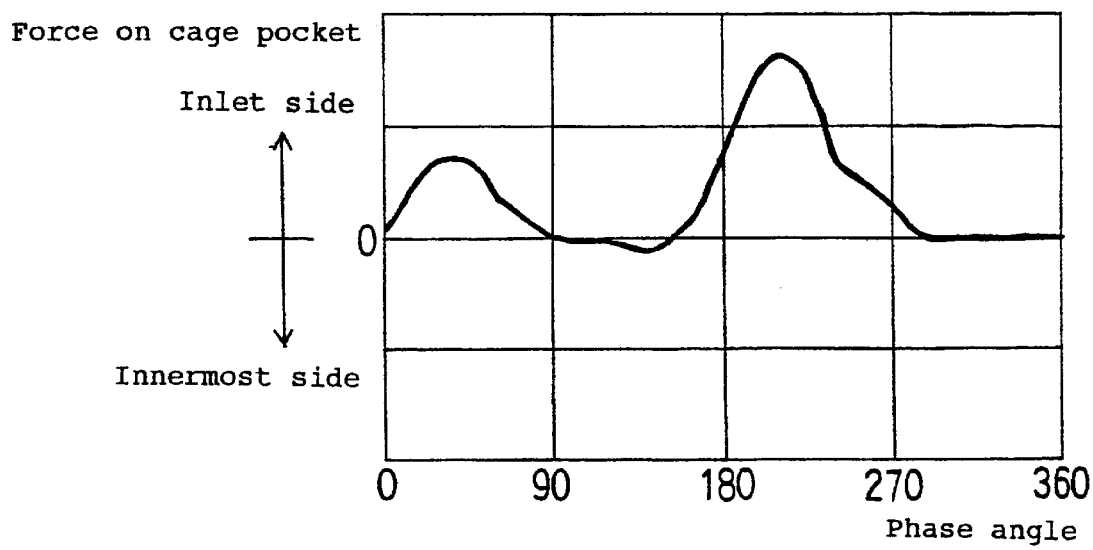
FIG. 9 shows the relation between a ball phase angle and a force on a cage pocket, wherein (a) is a characteristic diagram for the present inventive article and (b) is a characteristic diagram for a conventional article.
Figure 9B:
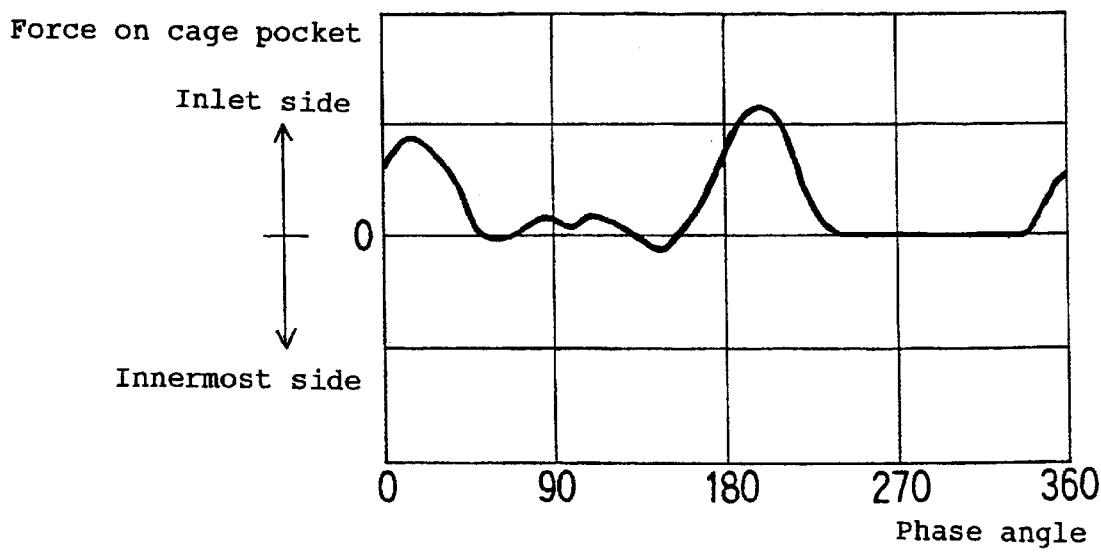

Further, in the phase (phase angle of 0°) where the ball 29 is most likely to jump out, as shown in FIG. 5, whereas the conventional article (FIG. 9(b)) has an inlet-directed force exerted to some extent to act on the cage pocket, the present inventive article (FIG. 9(a)) has almost no such force exerted, making it clear that the load on the cage 30 is reduced, and it has been found that as the cage offset quantity f is increased, the load on the cage 30 is reduced.

Figure 10:
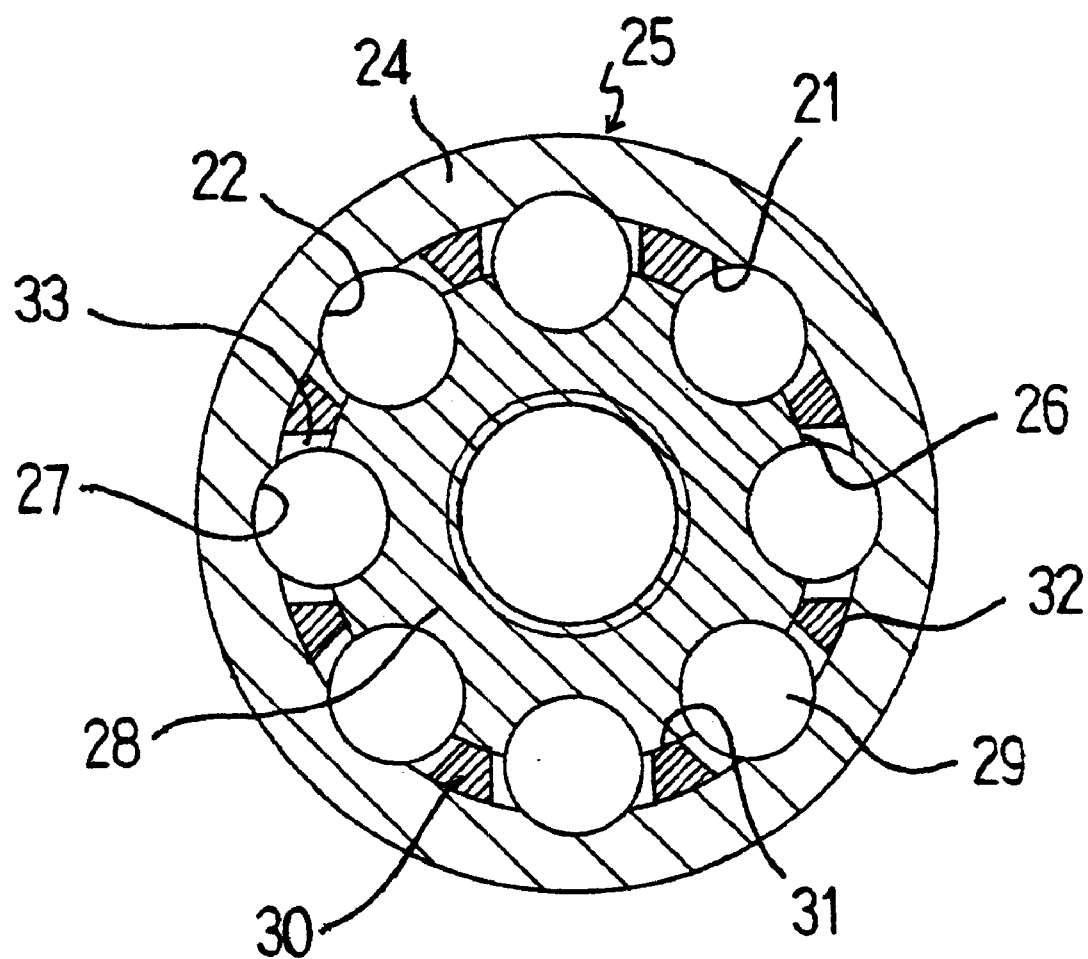
FIG. 10 is a side view, in section, with 8 balls used.

In the constant velocity joint of this embodiment, the number of balls 29 held in the cage 30 is preferably eight, as shown in FIG. 10. This constant velocity joint makes it possible to reduce the load on a single ball and to increase the efficiency and is superior in strength, loading torque and durability; the ball diameter can be reduced to reduce the size of the entire joint.

Further, as shown in FIG. 1, a pocket clearance t is formed in the innermost region of each pocket 33 of the cage 30 so as not to restrain the ball 29. This will mitigate damage caused to the innermost region of the cage 30 by the ball contacting the innermost region of the pocket 33 of the cage 30, even if the wall-thickness of the innermost region of the cage 30 is reduced with the increase of the cage offset quantity f, so that the strength of the cage 30 can be retained.

In the embodiment shown in FIG. 1, the track offset quantity F=0, that is, f/(f+F)=1.0. Therefore, the center of curvature, $O_1$, of the track groove 22 of the outer ring 25 and the center of curvature, $O_2$, of the track groove 27 of the inner ring 28 are positioned to coincide with each other in the joint center plane P.

In this constant velocity joint, since the track offset quantity F and the cage offset quantity f are set such that they satisfy the condition f/(f+F)=0.12–1.0, and since the cage offset quantity f is set at a large value so as to ensure that the pockets 33 of the cage 30 restrain the balls 29 from jumping out of the open end 23 of the outer ring 25, it becomes easier to simplify the incorporation of the inner ring 28 into the cage 30 and the incorporation of the cage 30 into the outer ring 25.

Figure 11:
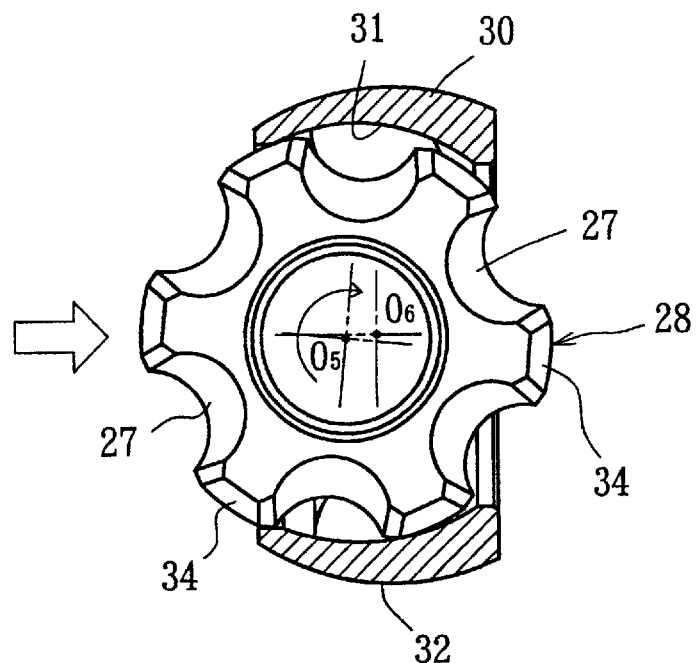
FIG. 11 is a sectional view showing the state of the inner ring being incorporated into the cage.
Figure 12:
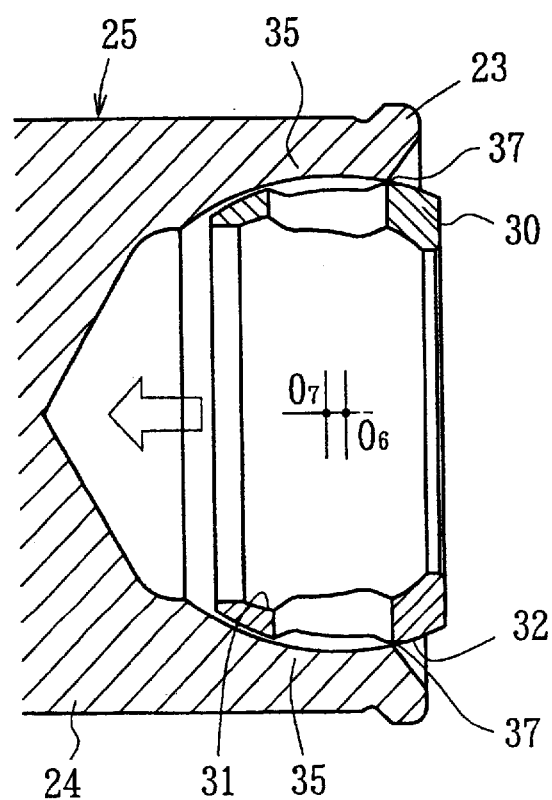
FIG. 12 is a sectional view showing the state of the cage being incorporated into the outer ring.

That is, since the opening diameter of the innermost region of the cage 30 is larger than in the conventional type, in incorporating the inner ring 28 into the case 30, the inner ring 28 can be inserted into the cage 30 without dropping the spherical projection 34 of the inner ring 28 from the innermost region of the cage 30 into the pocket 33 of the cage 30 as shown in FIG. 11. Further, since the inlet-side opening diameter of the outer ring 25 is larger than in the conventional type, in incorporating the cage 30 into the outer ring 25, the cage 30, as shown in FIG. 12, can be inserted into the outer ring 25 in such a manner that with the cage 30 facing the same axial direction as the outer ring 25, the pocket 33 is aligned with the spherical projection 35 of the outer ring 25.

Figure 4A:
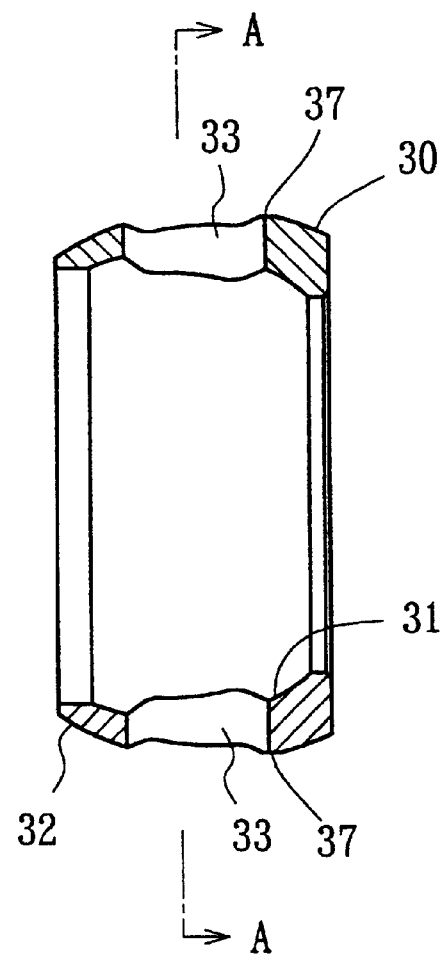
FIG. 4(a) is a sectional view showing a cage incorporated into the constant velocity joint of FIG. 1, and (b) is a sectional view taken along the line A—A in (a)
Figure 4B:
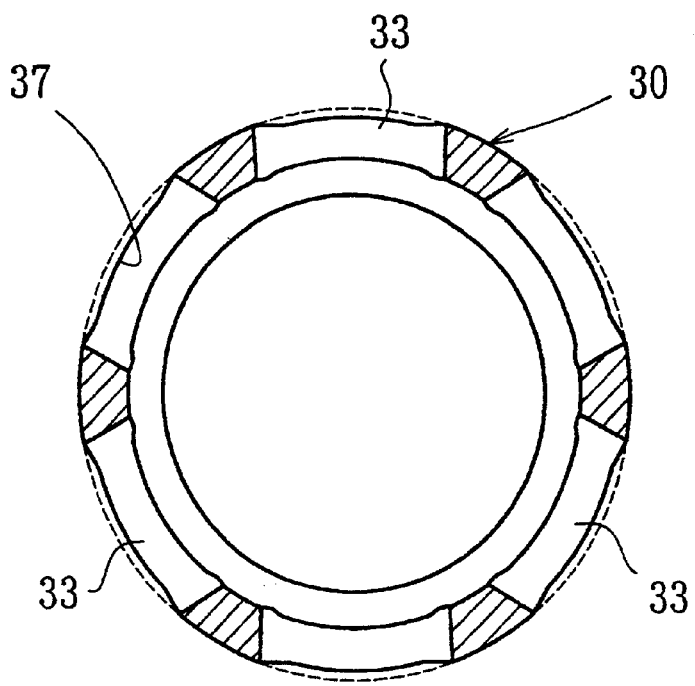

If the inlet-side end of the track groove 22 of the outer ring 25 is formed with a chamfer 36 (see FIG. 2) or if, in each pocket 33 of the cage 30, the outside open edges of the axially opposed side surfaces are formed with a chamfer 37 (see FIG. 4(*a*)), then the insertion into the outer ring 25 can be further facilitated in such a manner that with the cage 30 facing the same axial direction as the outer ring 25, the pocket 33 is aligned with the spherical projection 35 of the outer ring 25.

The simplification of the incorporating operation as described above allows the peripheral dimension of the pocket 33 in the cage 30 to be set by only giving consideration to the amount of peripheral movement of the ball 29 when an operating angle is taken during the incorporation of the ball 29, without having to give consideration to interference with the spherical projection 34 during the incorporation of the inner ring 28 or interference with the spherical projection 35 during incorporation into the outer ring 25, thus lessening limitations on the design of the joint. This makes it possible to easily secure the cage strength based on the pillar width dimension between adjacent pockets 33.

In the constant velocity joint of this embodiment, in order to provide a construction capable of taking larger operating angles than in the conventional type, the ratio of the cage offset quantity f to the total offset quantity (f+F) is so set as to satisfy the following conditions. Since the optimum range of the ratio of the cage offset quantity f to the total offset quantity (f+F) varies according to the size of the joint, it has to be determined in relation to the fundamental size indicating the joint size. Therefore, depending on the ratio of the total offset quantity (f+F) to the length PCR of a line connecting the center of curvature, $O_2$, of the track groove 27 of the inner ring 28 (or the center of curvature, $O_1$, of the track groove 22 of the outer ring 25) and the center of the ball 29, the ratio of the cage offset quantity f to the total offset quantity (f+F) is so set as to satisfy the conditions:

when *(f+F)/PCR*=0.1, *f/(f+F)*=0.35 or above, when *(f+F)/PCR*=0.2, *f/(f+F)*=0.11 or above, and when *(f+F)/PCR*=0.3, *f/(f+F)*=0.03 or above.

By so setting the ratio of the cage offset quantity f to the total offset quantity (f+F) as to satisfy said conditions depending on the ratio of the total offset quantity (f+F) to the length PCR of a line connecting the center of curvature, $O_1$, of the track groove 22 of the outer ring 25 (or the center of curvature, $O_2$, of the track groove 27 of the inner ring 28) and the ball center, a larger maximum operating angle than in the conventional type can be realized.

In the constant velocity joint that has thus realized a further increase in the maximum operating angle, since the ratio of the cage offset quantity f to the total offset quantity (f+F) is so set as to satisfy said conditions, it becomes effective to perform the incorporation of the balls 29 in the following manner.

As in the conventional case, with the inner ring 28 and cage 30 incorporated into the outer ring 25, the track grooves 22 of the outer ring 25, the pockets 33 of the cage 30, and the track grooves 27 of the inner ring 28 are radially positioned, whereupon the cage 30 and inner ring 28 are axially tilted with respect to the outer ring 25 such that the clearance between the open end 23 of the outer ring 25 and the inlet-side end of the pocket 33 of the cage 30 is larger than the ball diameter. One of the pockets 33 of the cage 30 is thus caused to face the outside through the open end 23 of the outer ring 25 and the ball 29 is inserted through the clearance between the open end 23 of the outer ring 25 and the inlet-side end of the pocket 33 of the cage 30. In this manner, the balls 29 are successively inserted into the remaining pockets 33.

Figure 13:
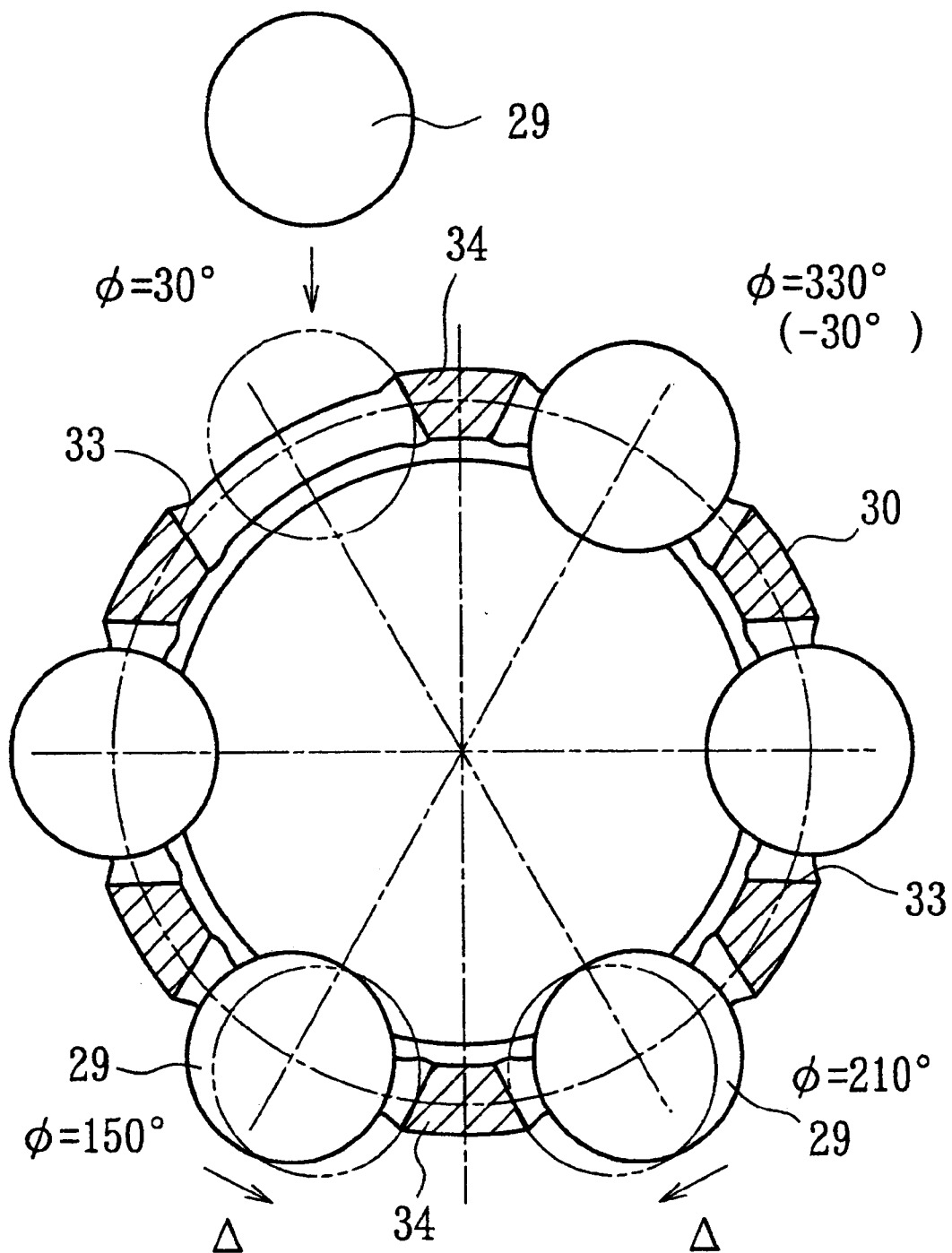
FIG. 13 is a sectional view showing the state of the last ball being inserted into the cage pocket.

And in incorporating the last ball 29, the latter is inserted into the pocket 33 in a direction that forms a predetermined phase angle, $\phi=\pm30°$, i.e., $\phi=30°$ or 330° with respect to the radial direction of the cage passing through the center of the pocket 33 of the cage 30, as shown in FIG. 13. That is, with the cage 30 disposed in a phase of $\phi=\pm30°$, i.e., $\phi=30°$ or 330° formed by a direction that connects the center of the pocket 33 into which the last ball 29 is to be incorporated and the center of the cage 30, the last ball 29 is inserted in radial direction of the cage into the pocket 33.

Figure 20:
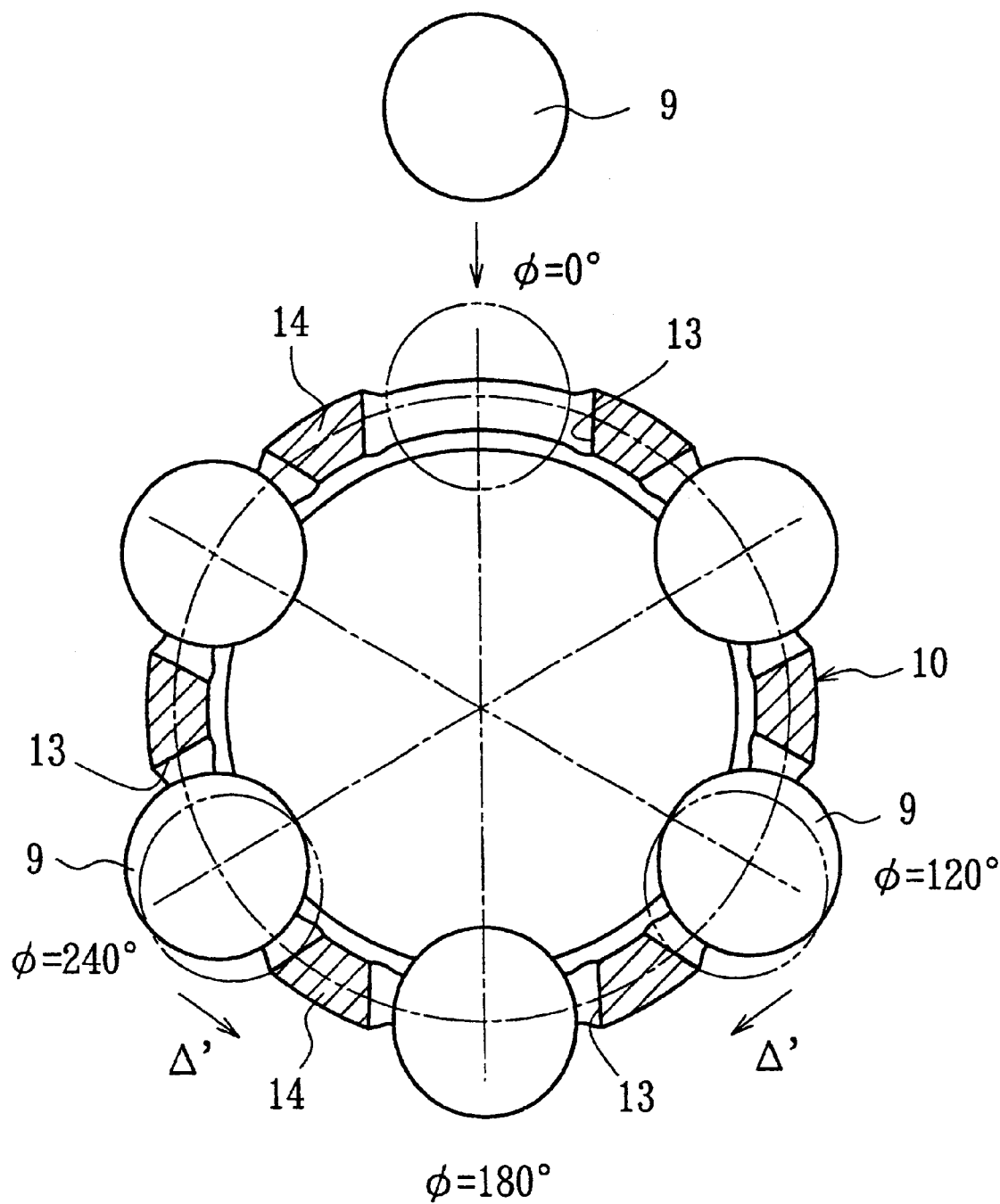
FIG. 20 is a sectional view showing the state of the last ball being inserted into the cage pocket.

With this arrangement, the angle of interference between the already incorporated ball 29 in the innermost region of the outer ring 25 and the pillar 34 between adjacent pockets 33 of the cage 30 can be made larger than in the conventional case. Therefore, when the last ball 29 is to be inserted, the amount of peripheral movement, Δ, of the balls 29 disposed on the track side having an axial curvature in the innermost region of the outer ring 25, i.e., the balls 29 that are in the phases of $\phi=150°$ and 210° becomes smaller than in the conventional case, i.e., the amount of peripheral movement, Δ', of the balls 9 in the phases of $\phi=120°$ and 240° when the ball 9 is to be incorporated from $\phi=0°$, as shown in FIG. 20. Therefore, the width dimension of the pillar 34 between adjacent pockets 33 of the cage 30 can be set at a large value and hence the strength of the cage 30 can be increased.

Figure 14:
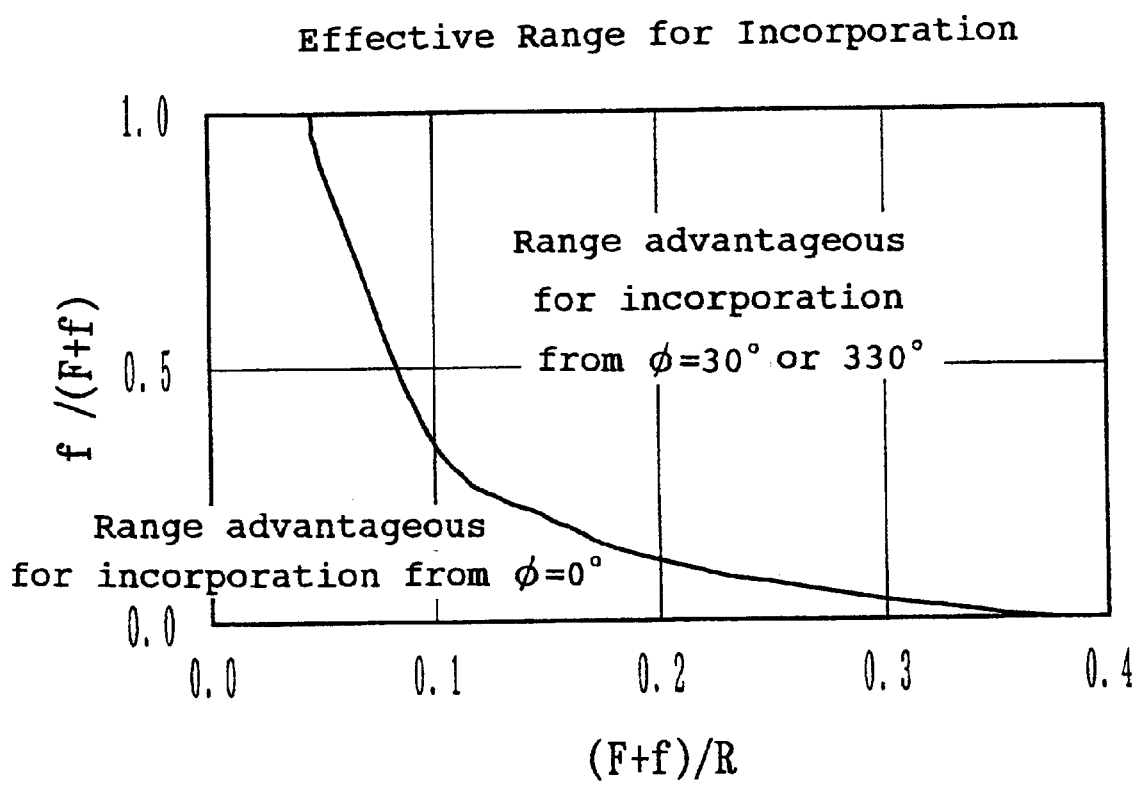
FIG. 14 is a characteristic diagram showing the effective range for incorporating the last ball.

In the constant velocity joint that has realized a further increase in the maximum operating angle, since the ratio of the cage offset quantity f to the total offset quantity (f+F) is so set as to satisfy the conditions:

when *(f+F)/PCR*=0.1, *f/(f+F)*=0.35 or above;

when *(f+F)/PCR*=0.2, *f/(f+F)*=0.11 or above;

when *(f+F)/PCR*=0.3, *f/(f+F)*=0.03 or above, the resulting range i s advantageous to the incorporation from $\phi=30°$ or 330°, as shown in FIG. 14. In contrast thereto, in the conventional constant velocity joint, since the ratio of the cage offset quantity f' to the total offset quantity (f'+F') is so set as to satisfy the conditions:

when $(f'+F')/PCR'=0.14$, $f'/(f'+F')=0$, and when $(f'+F')/PCR'=0.15$, $f'/(f'+F')=0.11$, the resulting range is advantageous to the incorporation from $\phi=0°$, as shown in FIG. 14.

The manner of incorporation of the last ball 29 described above may be employed for incorporation of the other balls 29 preceding the last ball 29. If the incorporation of all balls 29 is effected in the manner described above, the absence of the possibility of the ball 29 being disposed on the side diametrically opposite to the ball insertion side, i.e., in the phase of $\phi=180°$ concerning the radial direction of the cage, makes the axial length of the track unnecessary, with the result that the axial length of the outer ring 25 can be reduced and hence the entire assembly can be made compact in size.

In addition, the above embodiment has been described with reference to the case where the number of balls 29 held by the cage 30 is six; however, the invention is not limited thereto and is applicable to the case of using eight balls 29, the range advantageous to the incorporation from $\phi=\pm22.5°$ is the same as when there are six balls. In that case, the reduction of the load on a single ball and the increase of efficiency can be attained. The joint is superior in strength, loading torque, and durability, and the ball diameter can be reduced, so that the entire joint can be reduced in size.

What is claimed is:

1. A fixed type constant velocity joint comprising an outer ring whose inner spherical surface is formed with a plurality of track grooves disposed at circumferentially equispaced intervals to extend axially toward the open end, an inner ring whose outer spherical surface is formed with a plurality of track grooves paired with said track grooves of the outer ring and disposed at circumferentially equispaced intervals to extend axially, a plurality of balls interposed between the track grooves of the outer and inner rings to transmit torque, and a cage interposed between the inner spherical surface of the outer ring and outer spherical surface of the inner ring to hold the balls, said fixed type constant velocity joint is characterized in that the open-side groove bottoms of the track grooves of said outer ring are tapered to be linearly diameter-expanded toward said open end.

2. A fixed type constant velocity joint as set forth in claim 1, characterized in that a taper is formed such that the open-side groove bottoms of the track grooves of said outer ring are at right angles with a line connecting the center of curvature of said track groove and the ball center.

3. A fixed type constant velocity joint comprising an outer ring whose inner spherical surface is formed with a plurality of track grooves disposed at circumferentially equispaced intervals to extend axially toward the open end, an inner ring whose outer spherical surface is formed with a plurality of track grooves paired with said track grooves of the outer ring and disposed at circumferentially equispaced intervals to extend axially, a plurality of balls interposed between the track grooves of the outer and inner rings to transmit torque, and a cage interposed between the inner spherical surface of the outer ring and outer spherical surface of the inner ring to hold the balls, said fixed type constant velocity joint is characterized in that the open-side groove bottoms of the track grooves of said outer ring are tapered to be linearly diameter-expanded toward said open end;

wherein the operating angle formed between the rotatable shaft of said outer ring and the rotatable shaft of said inner ring has 52° at the maximum.

4. A fixed type constant velocity joint comprising an outer ring whose inner spherical surface is formed with a plurality of track grooves disposed at circumferentially equispaced intervals to extend axially toward the open end, an inner ring whose outer spherical surface is formed with a plurality of track grooves paired with said track grooves of the outer ring and disposed at circumferentially equispaced intervals to extend axially, a plurality of balls interposed between the track grooves of the outer and inner rings to transmit torque, and a cage interposed between the inner spherical surface of the outer ring and outer spherical surface of the inner ring to hold the balls, said fixed type constant velocity joint is characterized in that the open-side groove bottoms of the track grooves of said outer ring are tapered to be linearly diameter-expanded toward said open end;

wherein the centers of the outer and inner peripheral surfaces of the cage are axially offset with respect to the joint center plane including the ball center in opposite directions by an equal distance, the cage offset quantity is set at a large value so as to ensure that the pockets of the cage restrain the balls from jumping out of the open end of the outer ring, and the following condition is satisfied:

$f/PCR=0.017-0.150$, where f is said cage offset quantity, and PCR is the length of a line connecting the center of curvature of the track groove of the outer ring or the center of curvature of the track groove of the inner ring and the ball center.

5. A fixed type constant velocity joint comprising an outer ring whose inner spherical surface is formed with a plurality of track grooves disposed at circumferentially equispaced intervals to extend axially toward the open end, an inner ring whose outer spherical surface is formed with a plurality of track grooves paired with said track grooves of the outer ring and disposed at circumferentially equispaced intervals to extend axially, a plurality of balls interposed between the track grooves of the outer and inner rings to transmit torque, and a cage interposed between the inner spherical surface of the outer ring and outer spherical surface of the inner ring to hold the balls, said fixed type constant velocity joint is characterized in that the open-side groove bottoms of the track grooves of said outer ring are tapered to be linearly diameter-expanded toward said open end;

wherein the center of curvature of the track groove of the outer ring and the center of curvature of the track groove of the inner ring are axially offset with respect to the joint center plane including the ball center in opposite directions by an equal distance, the centers of the outer and inner peripheral surfaces of the cage are axially offset with respect to said joint center plane in opposite directions by an equal distance, the cage offset quantity is set at a large value so ass to ensure that the pockets of the cage restrain the balls from jumping out of the open end of the outer ring, and the following condition is satisfied:

$f/(f+F)=0.12-1.0$, where F is said track offset quantity, and f is said cage offset quantity.

6. A fixed type constant velocity joint comprising an outer ring whose inner spherical surface is formed with a plurality of track grooves disposed at circumferentially equispaced intervals to extend axially toward the open end, an inner ring whose outer spherical surface is formed with a plurality of track grooves paired with said track grooves of the outer ring and disposed at circumferentially equispaced intervals to extend axially, a plurality of balls interposed between the track grooves of the outer and inner rings to transmit torque, and a cage interposed between the inner spherical surface of the outer ring and outer spherical surface of the inner ring to hold the balls, said fixed type constant velocity joint is characterized in that the open-side groove bottoms of the track grooves of said outer ring are tapered to be linearly diameter-expanded toward said open end;

wherein the center of curvature of the track groove of the outer ring and the center of curvature of the track groove of the inner ring are axially offset with respect to the joint center plane including the ball center in opposite directions by an equal distance, the centers of the outer and inner peripheral surfaces of the cage are axially offset with respect to said joint center plane in opposite directions by an equal distance, and the following conditions are satisfied:

when $(f+F)/PCR=0.1$, $f/(f+F)=0.35$ or above, when $(f+F)/PCR=0.2$, $f/(f+F)=0.11$ or above, and when $(f+F)/PCR=0.3$, $f/(f+F)=0.03$ or above where F is the former track offset quantity, f is the latter cage offset quantity, and PCR is the length of a line connecting the center of curvature of the track groove of the outer ring or the center of curvature of the track groove of the inner ring of the joint and the ball center.

7. A fixed type constant velocity joint as set forth in any one of claims 1–5, characterized in that the open end of the inner spherical surface of said outer ring is chamfered.

8. A fixed type constant velocity joint as set forth in any one of claims 1–3, characterized in that in the pocket of the cage, the outside open edges of the axially opposed side surfaces are formed with a chamfer.

9. A fixed type constant velocity joint as set forth in claim 1, characterized in that the number of balls is eight.

10. A fixed type constant velocity joint as set forth in claim 1, characterized in that a pocket clearance is formed so as not to restrain the ball in the innermost region of each pocket of said cage.

11. A method of assembling a fixed type constant velocity joint comprising an outer ring whose inner spherical surface is formed with a plurality of track grooves disposed at circumferentially equispaced intervals to extend axially toward the open end, an inner ring whose outer spherical surface is formed with a plurality of track grooves paired with said track grooves of the outer ring of the joint and disposed at circumferentially equispaced intervals to extend axially, a plurality of balls interposed between the track grooves of the outer and inner rings to transmit torque, and a cage interposed between the inner spherical surface of the outer ring and outer spherical surface of the inner ring to hold the balls, said method being characterized in that the center of curvature of the track groove of the outer ring and the center of curvature of the track groove of the inner ring are axially offset with respect to the joint center plane including the ball center in opposite directions by an equal distance, the centers of the outer and inner peripheral surfaces of the cage are axially offset with respect to said joint center plane in opposite directions by an equal distance, and the following conditions are satisfied, and when the last ball is to be incorporated into a pocket of the cage, the ball is inserted the ball in the direction that forms a predetermined phase angle with the radial direction of the cage passing through the center of the pocket:

when $(f+F)/PCR=0.1$, $f/(f+F)=0.35$ or above, when $(f+F)/PCR=0.2$, $f/(f+F)=0.11$ or above, and when $(f+F)/PCR=0.3$, $f/(f+F)=0.03$ or above where F is the former track offset quantity, f is the latter cage offset quantity, and PCR is the length of a line connecting the center of curvature of the track groove of the outer ring or the center of curvature of the track groove of the inner ring of the joint and the ball center.

12. A method of assembling a fixed type constant velocity joint as set forth in claims 11, characterized in that the number of balls is eight.

13. A method of assembling a fixed type constant velocity joint as set forth in claims 11 or 12, characterized in that a pocket clearance is formed so as not to restrain the ball in the innermost region of each pocket of said cage.

* * * * *